Oct. 16, 1928.
D. BORROR
1,687,749
AUTOMOBILE TIRE CARRIER
Filed July 30, 1927          2 Sheets-Sheet 2
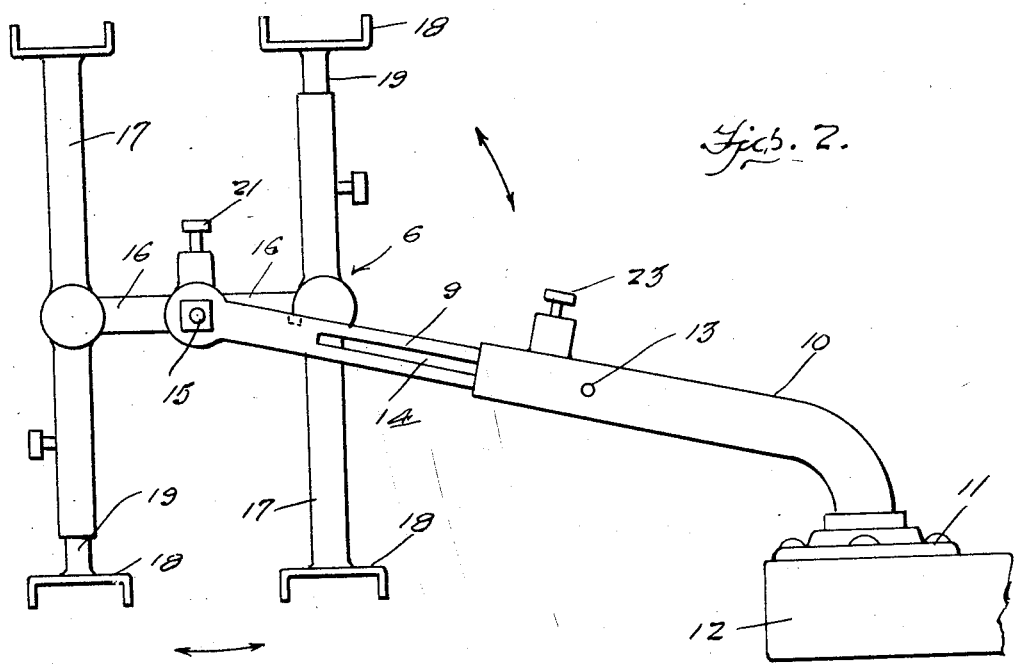
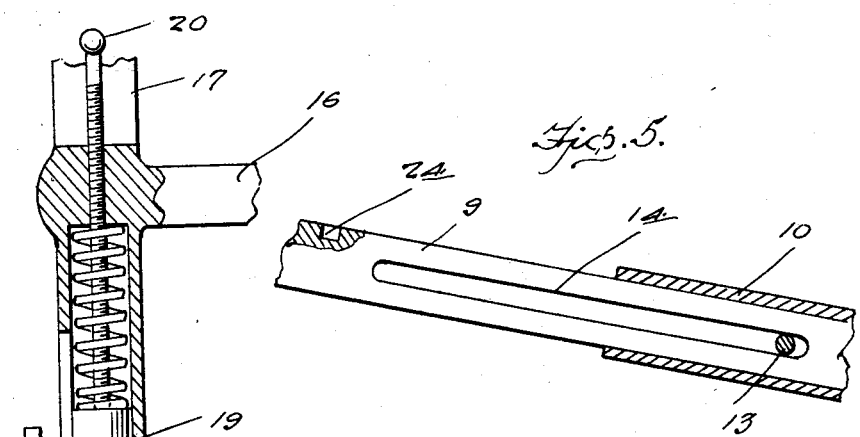
Inventor
Donald Borror
By 
Attorney Patented Oct. 16, 1928.

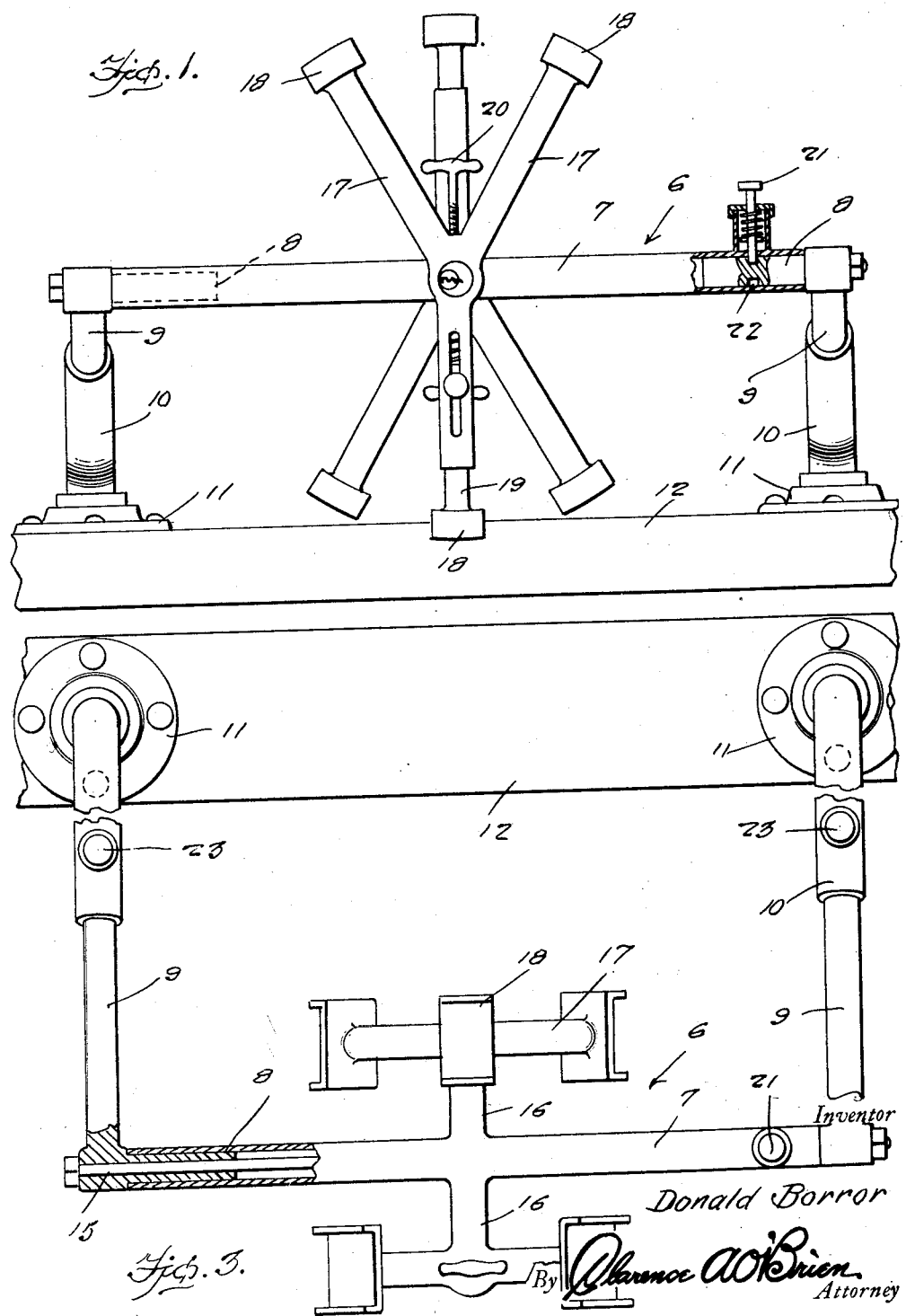

1,687,749

UNITED STATES PATENT OFFICE.

DONALD BORROR, OF GARNETT, KANSAS.

AUTOMOBILE TIRE CARRIER.

Application filed July 30, 1927. Serial No. 209,626.

The present invention relates to an improved tire carrier especially, although not necessarily, adapted for use upon automobiles, and it has more particular reference to a carrier which is constructed to accommodate and carry two or more tires.

The alleged novelty is based more particularly upon the provision of a rotary head which includes spaced parallel carriers for two or more tires, said head being rotatably mounted on novel supporting means which permits it to be rotated in a manner to permit the inside carrier to be disposed outwardly for removing the inside tire first if desired, without disturbing the outside tire carrier.

The particular details and relative arrangement of parts and association thereof, serving to produce this novel structure will become more readily apparent from the following description and drawings.

In the drawings:—

Figure 1 is a rear elevational view of a tire carrier constructed in accordance with the present invention, showing the head retaining latch in section.

Fig. 2 is a side elevational view of the same structure.

Fig. 3 is a top plan view with portions broken away and shown in section, to display details more plainly.

Fig. 4 is a fragmentary detail section and elevation, showing the adjustable arm of one of the tire carriers.

Fig. 5 is an enlarged fragmentary sectional and elevational view showing the extensible supporting rods.

Referring now to the drawings in detail, it will be seen that the reference character 6 designates what may be generally referred to as a rotary head. This head comprises a horizontally disposed tubular shaft 7, mounted for rotation upon journals 8. These journals are formed upon the outer ends of a pair of extensible rods 9 which are telescopically or slidably mounted in supporting tubes 10. Incidentally, these tubes are formed at their inner ends with attaching flanges 11 fastened in any suitable manner to the frame 12 of the automobile.

In this connection, attention is directed to Fig. 5, wherein it will be seen that each of the tubes 10 is provided with a cross pin 13 extending through an elongated slot 14, in the complemental rod 9. A long bolt 15 extends through the outer end portion of the rods 9 and also through the journals 8 and then thru the tubular rotary shaft 7. This rotary shaft is provided at its center with diametrically opposite arms 16 each of which is supplied with an individual tire carrier. As is customary, each tire carrier is made up of radiating arms 17 having suitable seats 18 at their outer ends for reception of the removable tire and rim.

It might be stated here, that each tire carrier is provided with an adjustable arm 19, (see Fig. 4), which is moved or actuated by an operating bolt 20. No particular stress however, is placed upon the construction of the tire carrier, particularly upon the duplicate arrangement of these individual carriers, upon the central portion of the rotary shaft.

At this time, attention is invited to a spring pressed latch 21 (see Fig. 1), which cooperates with keeper seats 22 formed in one of the aforesaid journals. This serves to hold the shaft 7 in set position. It will also be noticed that similar spring pressed latches 23, are mounted upon the outer end portions of the supporting tubes 10 and cooperate with keeper seats 24 (see Fig. 5), in the rods 9.

It is understood that under normal conditions, the rods 9 are telescoped into the tubes 10 and retained in place through the medium of the cooperating latches 23, and keeper seats 24. Thus, the tire carriers are disposed in close proximity to the body of the automobile, and the cap 7 is held against rotation by the latch 21. Assuming that it is desired for instance to remove the inner tire from the corresponding tire carrier, it will be observed that rods 9 are pulled out to the position shown in Fig. 2. This provides clearance between the tire carriers and the body of the automobile, permitting tire carriers and shaft 7 to be bodily rotated throughout an approximate half circle permitting removal of the inner tire and rim.

In the form of ordinary dual tire carriers, it is usually necessary to remove the outer tire before the inner tire can be taken off. With this arrangement, it is permissible to remove either the outer tire, or the inner tire, depending upon the selection made, The advantage of this arrangement is quite evident to persons skilled in the art to which the invention relates.

Having thus described my invention, what I claim as new is:—

In a tire carrier structure of the class described, a pair of attachment and supporting tubes, rods slidably mounted in said tubes, journals carried by the outer ends of said rods, a tubular shaft mounted for rotation between said rods and upon said journals, and a plurality of individual tire carriers carried by said shaft.

In testimony whereof I affix my signature.

DONALD BORROR.